(12) United States Patent
Muntnich et al.

(10) Patent No.: US 6,367,983 B1
(45) Date of Patent: Apr. 9, 2002

(54) NEEDLE BEARING CAGE AND METHOD FOR PRODUCING THE SAME

(75) Inventors: Leo Muntnich, Aurachtal; Wolfgang Fugel, Nurmemberg, both of (DE)

(73) Assignee: Ina Walzlager Schaeffler OHG, Herzogenaurach (DE)

( * ) Notice: Subject to any disclaimer, the term of this patent is extended or adjusted under 35 U.S.C. 154(b) by 0 days.

(21) Appl. No.: 09/581,099

(22) PCT Filed: Oct. 26, 1998

(86) PCT No.: PCT/EP98/06783

§ 371 Date: Jun. 7, 2000

§ 102(e) Date: Jun. 7, 2000

(87) PCT Pub. No.: WO99/30048

PCT Pub. Date: Jun. 17, 1999

(30) Foreign Application Priority Data

Dec. 10, 1997 (DE) .......................................... 197 54 836

(51) Int. Cl.⁷ ........................... F16C 33/46; B21D 28/00
(52) U.S. Cl. ................... 384/580; 29/898.067; 384/572
(58) Field of Search ................................ 384/580, 572, 384/575, 577, 578, 579; 29/898.064, 898.065, 898.067

(56) References Cited

U.S. PATENT DOCUMENTS

| 1,928,823 A | * | 10/1933 | Young .......................... 384/577 |
| 3,992,764 A | * | 11/1976 | Serasio ................... 29/898.067 |
| 5,795,080 A | * | 8/1998 | Fugiwara et al. ........... 384/580 |

FOREIGN PATENT DOCUMENTS

| CH | 401599 | 5/1966 | |
| DE | 461566 | 8/1959 | |
| DE | 973310 | 1/1960 | |
| DE | 1425085 | 4/1969 | |
| DE | 2320901 | 11/1973 | |
| DE | 2641918 | 3/1977 | |
| DE | 4442269 | 6/1995 | |
| DE | 29507294 | 8/1995 | |
| FR | 1115337 | 4/1956 | |
| FR | 1538943 | 9/1968 | |
| FR | 2183488 | 12/1973 | |
| FR | 2283356 | 8/1975 | |
| JP | 53025752 | * | 3/1978 | ................. 384/579 |

* cited by examiner

Primary Examiner—Thomas R. Hannon

(57) ABSTRACT

The invention relates to a window cage (1) for a needle bearing. The pockets (5) of said window cage are formed by punched out sections and by a stamping process with material displacement in a cage strip (9) which is then bent round. According to the invention, the window cage (1) is characterized in that before the cage strip (9) is bent, the opposite surfaces of the web walls of a pocket (5) are made up of three sub-surfaces (10, 11, 12) in the area of the retaining projections (7, 8). The first two sub-surfaces (10) follow a course which is parallel to a middle vertical (13) and each extend into a second sub-surface (11) at their upper end, said second sub-surface running diagonally in the direction of the central point of the pocket. Each of the second sub-surfaces then ends in a third sub-surface (12) which also runs parallel to the middle vertical (13).

5 Claims, 3 Drawing Sheets

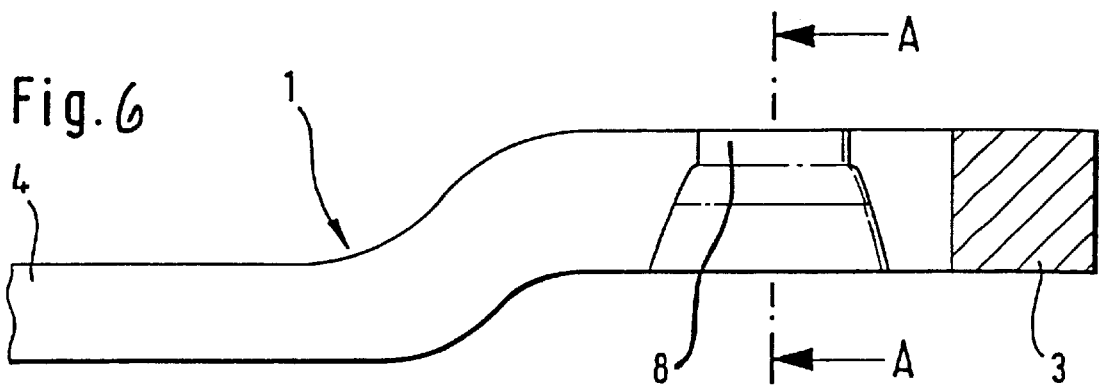
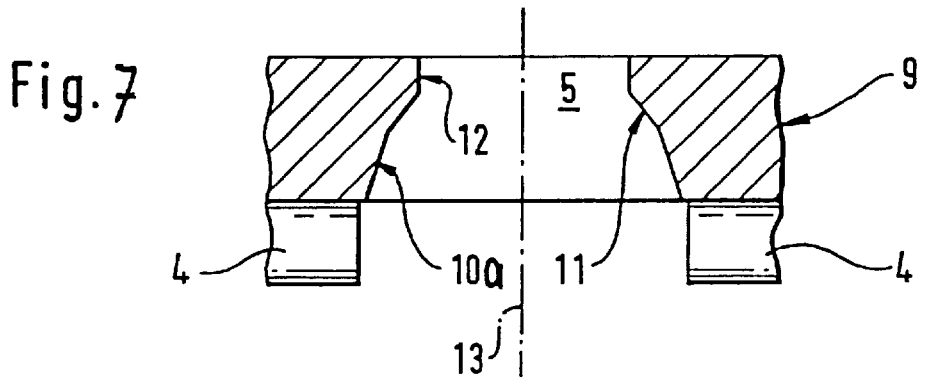
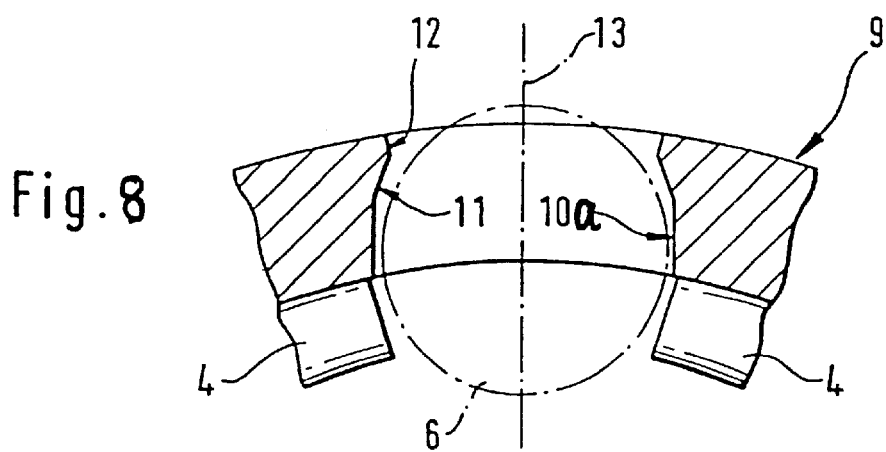

NEEDLE BEARING CAGE AND METHOD FOR PRODUCING THE SAME

This application is a 371 of PCT/EP98/06783 filed Oct. 26, 1998.

FIELD OF THE INVENTION

The invention concerns a cylindrical window-type cage for a needle roller bearing.

BACKGROUND OF THE INVENTION

A generic cage of the pre-cited type is known from DE-GM 18 29 610. This cylindrical window-type cage is made of a strip into which at first pockets are punched which are then deformed with a stamping tool so that when the metal strip is bent to form a cage, retaining projections are formed which prevent the needle rollers from falling out of the cage in outward direction. The retention of the needle rollers in inward direction is effected by the inclined walls of the crossbars. The material displacement which is initiated by the additional stamping process is such that material is displaced from the inside towards the outside so that after completion of the stamping process, the cage pocket, as seen in cross-section, ends in a roof-shape i.e., it tapers towards the outside.

A disadvantage of this is that, especially in bearing cages with a small diameter, the strong bending of the strip can lead to a clamping of the rolling elements in the pocket. A further disadvantage is that this shape of the pockets makes it more difficult to fill them with the rolling elements.

SUMMARY OF THE INVENTION

The object of the invention is therefore to provide a pocket shape which, particularly in the case of cages with a small diameter, permits a simple manufacturing of the bearing.

The invention achieves this object by the fact that in the unbent state of the cage strip, the surfaces of the crossbar walls of a pocket situated opposite each other are formed in the region of the retaining projections with three partial surfaces such that the first partial surfaces are parallel to a central vertical line and merge at their upper ends into inclined second partial surfaces pointing towards the center of the pocket, each of the second partial surfaces ending in a third partial surface which is likewise parallel to the central vertical line.

In this type of pocket configuration in which the retention of the rolling elements in inward direction is effected by the inclination of the crossbar walls and in outward direction by the retaining projections, the needle roller bearing cage is reliably guided on the partial surfaces situated in the middle and inclined towards each other. The configuration of the cross-section of the pockets according to the invention has the further advantage that, in small bearing cages which necessitate a very strong bending of the cage strip, no cracks and undesired deformations occur in the region of the pockets. A further additional advantage is that, due to the enlarged clear width of the pocket in upward direction, a more favorable elastic snapping-in of the needle rollers into the cage is possible.

The ratio of the diameter $D_L$ of the needle rollers to the pitch circle diameter $D_{TK}$ is $\geq 1{:}6$. This means that the stamped pockets can be used particularly advantageously in cages having a small diameter i.e., in cages in which the original strip is subjected to a strong bending.

The manufacturing of a needle roller bearing cage is effected by the following steps:

punching a cage strip to form pockets defined by crossbars for the reception of the needle rollers, introducing a tong-like stamping tool with two stamping jaws into adjoining pockets, pressure-loading said tool so that a displacement of material takes place such that, in the region of the retaining projections, opposing surfaces of the crossbar walls of a pocket are formed with three partial surfaces such that the two first partial surfaces are parallel to a central vertical line and merge at their upper ends into inclined second partial surfaces pointing towards the center of the pocket, each of the second partial surfaces ending in a third partial surface which is likewise parallel to the central vertical line, cutting off a length of the cage strip to obtain a ratio of the diameter $D_L$ of the needle rollers to the pitch circle diameter $D_{TK}$ of $>1{:}6$, bending round the cage strip in a direction opposite to that of the material displacement and, if necessary, joining the abutting ends of the cage to each other.

Further, in the unbent state of the cage strip, the surfaces of the crossbar walls of a pocket situated opposite each other are formed in the region of the retaining projections with three partial surfaces such that the first partial surfaces are inclined relative to a central vertical line and point towards the center of the pocket while merging at their upper ends into second partial surfaces that are parallel to the central vertical line, each of the second partial surfaces ending in a third partial surface which is likewise inclined.

Due to this configuration of the pocket in the cage strip, the bent round cage can be filled with needle rollers without any problem from the inside, while the previously described cage shapes are mainly intended for the filling of the needle rollers from the outside. The manufacture of such a cage is effected in a manner analogous to the already described methods.

Finally, in the unbent state of the cage strip, the surfaces of the crossbar walls of a pocket situated opposite each other are formed in the region of the retaining projections with three partial surfaces such that the first partial surfaces are inclined relative to a central vertical line towards the center of the pocket and merge at their upper ends into likewise inclined second partial surfaces, each of the second partial surfaces ending in a third partial surface which is parallel to the central vertical line.

To conclude, the crossbars are profiled. As known, this means that the crossbars connecting the two side rings do not extend in one continuous horizontal line but are offset in upward or downward direction in a part of their axial length so that a horizontal portion is formed outside or inside the pitch circle, said horizontal portion being limited by two portions of the crossbar which extend at an angle to the bearing axis.

The invention will now be described more closely with reference to the following examples of embodiment.

BRIEF DESCRIPTION OF THE DRAWINGS

FIGS. 2, 4, and 7 show sections taken along line A—A of FIG. 1 and FIG. 6 respectively, in the unbent state of the cage strip, FIGS. 3, 5, and 8 show sections taken along line A—A of FIG. 1 and FIG. 6 respectively, in the bent state of the cage strip, and FIG. 6 is a side view of an offset cage shown partly in section.

DETAILED DESCRIPTION OF THE DRAWINGS

Figure 1:
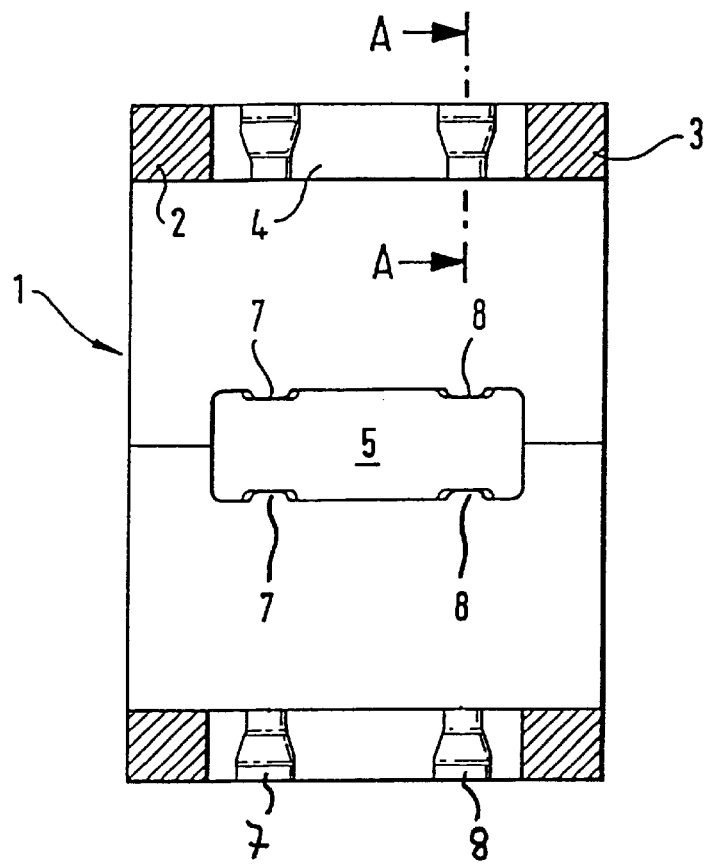
FIG. 1 is a side view of a needle roller cage according to the invention shown partly in section.

The window-type cage identified at 1 in FIG. 1 comprises two side rings 2 and 3 which are connected to each other by a plurality of crossbars 4 spaced uniformly over the periphery. The pockets 5 thus formed for receiving the needle rollers 6 are defined by the side rings 2 and 3 and the crossbars 4. Along their axial length, the crossbars 4 comprise two retaining projections 7 and 8 which are spaced apart from each other and retain the needle rollers 6 in the pocket 5 in outward direction.

Figure 2:
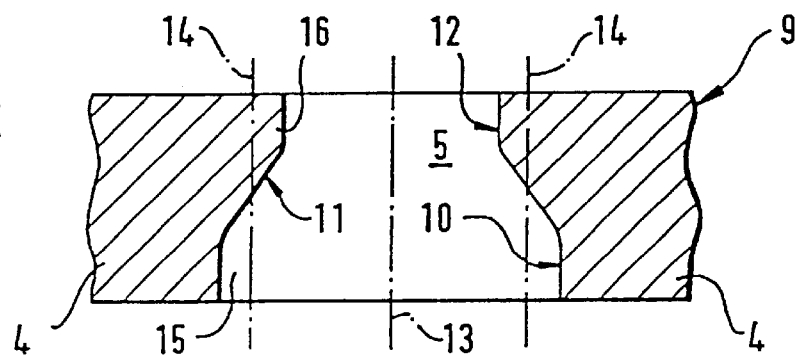

As can be seen from FIG. 2, in the unbent state of the cage strip 9, the surfaces of the crossbar walls, or of the pockets 5, situated opposite each other comprise the three partial surfaces 10, 11, 12 in the region of the retaining projections 7, 8. At its lower end, the pocket 5 is defined by first partial surfaces 10 which are parallel to a central vertical line 13 and merge at their upper ends into second partial surfaces 11 which are inclined towards each other and which, in turn, merge into opposite third partial surfaces 12 which are likewise parallel to the central vertical line 13. In this way, as seen in section, a funnel-shaped pocket 5 is formed which tapers in upward direction and thus has the widest opening at its lower end.

Figure 3:
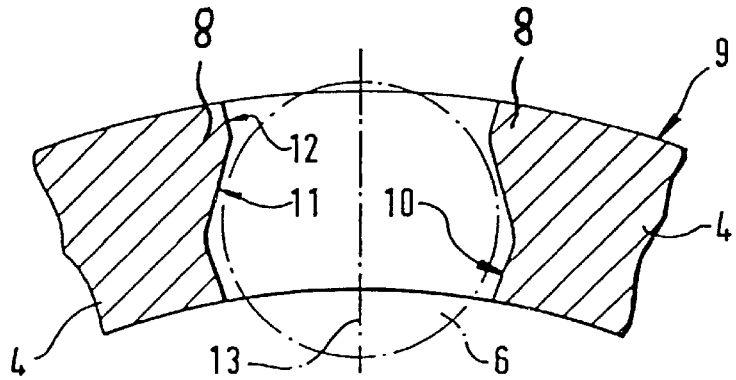

If now, as can be seen from FIG. 3, the cage strip 9 is bent downwards to form a cylindrical window-type cage 1, the shape of the pocket 5 also changes. Due to the bending, the first partial surfaces 10 are no longer parallel to each other but bent inwards towards the center of the bearing. It is assured, in this way, that the needle rollers 6 cannot exit from the pocket 5 in radially inward direction i.e., the retention of the needle rollers 6 is effected by the inclination of the first partial surfaces 10, the clear space between which is slightly smaller than the diameter of the needle roller 6. Due to the bending, the inclination of the second partial surfaces 11 also changes i.e., their deviation from the central vertical line 13 is smaller than in FIG. 2. During the operation of the bearing, the needle rollers 6 are mainly guided on these second partial surfaces 11 in the region of the pitch circle. Finally, the third partial surfaces 12 also change their position due to the bending of the cage strip 9 such that the clear width of the pocket 5 at the outer periphery of the cage strip 9 or the window-type cage 1 is enlarged after bending. This enlargement permits an unproblematic insertion of the needle rollers 6 into the window-type cage 1 from the outside. The clear space between the third partial surfaces 12 in their region adjoining the partial surface 11, however, is only slightly smaller than the diameter of the needle rollers 6 so that these can be snapped into the pocket 5 in the elastic region thus avoiding damage to the retaining projections 7, 8 or to the rolling-contact surfaces of the needle rollers 6.

Such a window-type cage 1 is made by at first punching out pockets 5 out of a flat cage strip 9 with a punching tool. The pocket edges thus obtained are parallel to the central vertical line 13 i.e., they extend along the vertical line 14 represented as a broken line in FIG. 2. Stamping is carried out in a known manner by introducing one or more stamping tools into adjacent pockets 5 and applying a force to the tools so that the crossbar 4 separating the two pockets 5 is plastically deformed on both sides. Pressure is applied to the crossbar 4 along its axial length from both sides by a stamping tool whose contour corresponds to the desired contour of the retaining projections 7, 8 to be formed, and thus also to the contour of the partial surfaces 10, 11, 12. These stamping tools are then moved towards each other so that a plastic displacement of material takes place in upward direction, that is to say, as can be seen from FIG. 2, from the region 15 into the region 16. After the pockets 5 have been stamped, the cage strip 9 is cut to the required length, bent into a round shape and, if necessary, its two abutting ends are joined firmly to each other.

Figure 4:
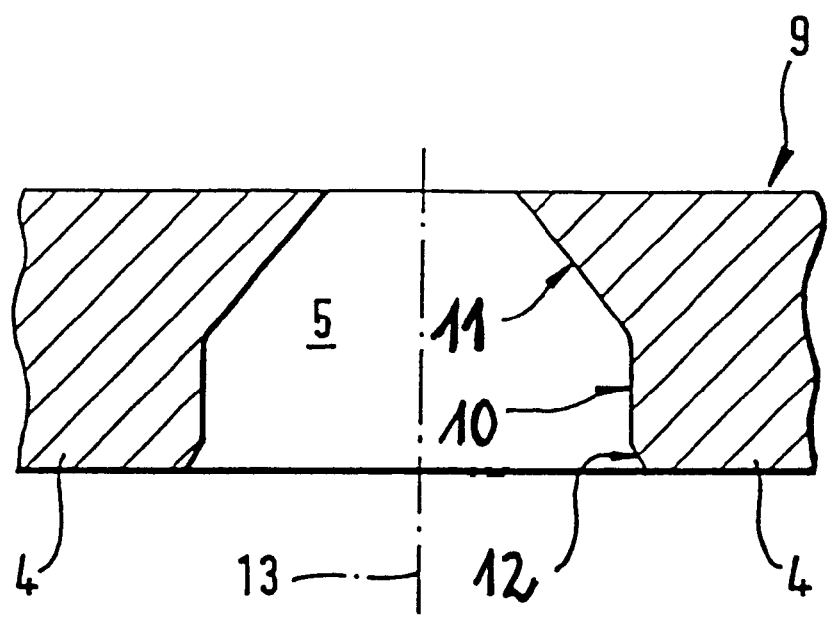
Figure 5:
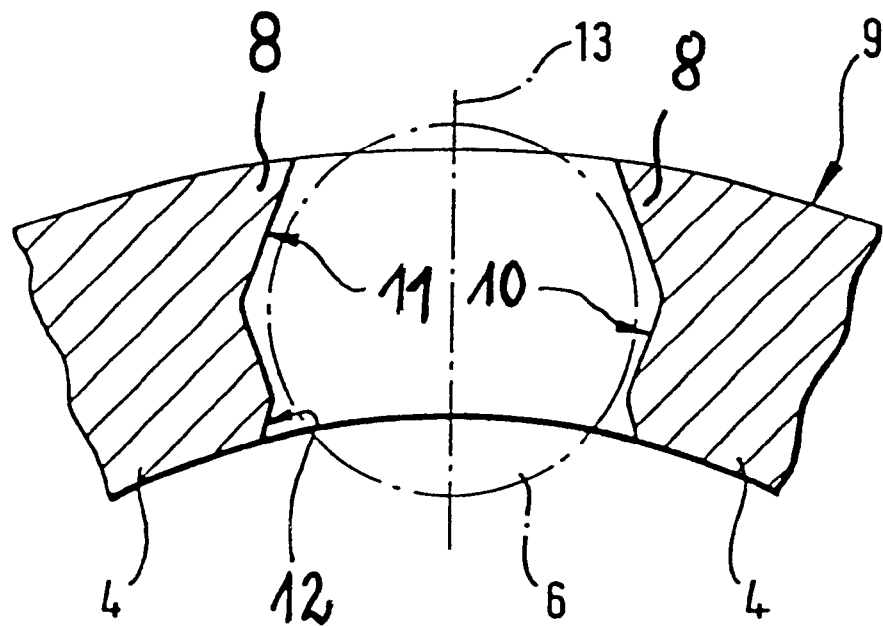

FIGS. 4 and 5 illustrate the pocket shape described in a second embodiment. In this case, in the unbent state of the cage strip 9, the pocket 5 again begins at its lower end with the first partial surfaces 12 which, however, are inclined towards the center of the pocket 5 and merge at their upper ends into the second partial surfaces 10 which are parallel to the central vertical line 13. These, in turn, merge at their upper ends into the third partial surfaces 11 which are inclined towards the central vertical line 13. In this way, a funnel-shaped pocket 5 is obtained which, however, differs from the pocket illustrated in FIG. 2 in the aforesaid manner. By this configuration of the first partial surface 12 it is assured that the needle rollers 6 can be snapped elastically into the pockets 5 radially from the inside. The falling-out of the needle rollers 6 in inward direction is prevented in this case by the partial surfaces 10, the clear space between whose lower ends is only slightly smaller than the diameter of the needle roller 6. This likewise assures that the needle rollers 6 can be inserted into the pockets 5 of the window-type cage 1 in the elastic region from the inside.

FIGS. 6, 7 and 8 show the cage 1 described in a third embodiment. The central portion of the crossbars 4 of this cage is offset towards the center of the bearing so that a falling-out of the needle rollers 6 in outward direction is prevented by the retaining projections 7 and 8, and in inward direction, by the inclination of crossbars 4 i.e., by their offset portions. In the unbent state of the cage strip 9, the pocket 5 is configured such that the first partial surface 10a is inclined at a defined angle to the central vertical line 13 and merges at its upper end into the second partial surface 11 which is inclined further relative to the first partial surface 10a towards the central vertical line 13. The second partial surface 11, in turn, merges at its upper end into a third partial surface 12 which is parallel to the central vertical line 13.

What is claimed is:

1. A cylindrical window-type cage (1) for a needle roller bearing which receives the needle rollers (6) in pockets (5) uniformly spaced from one another by crossbars (4), said pockets (5) being formed by punching and by stamping with displacement of material in a cage strip (9) so that after the bending round of the cage strip (9) the needle rollers (6) are retained in inward direction by the inclination of the crossbar walls and in outward direction by retaining projections (7, 8), characterized in that, in the unbent state of the cage strip (9), the surfaces of the crossbar walls of a pocket (5) situated opposite each other are formed in the region of the retaining projections (7, 8) with three partial surfaces (10, 11, 12) such that the first partial surfaces (10) are parallel to a central vertical line (13) and merge at their upper ends into inclined second partial surfaces (11) pointing towards the center of the pocket, each of the second partial surfaces (11) ending in a third partial surface (12) which is likewise parallel to the central vertical line (13).

2. A cylindrical window-type cage (1) according to claim 1, characterized in that the ratio of the diameter $D_L$ of the needle rollers (6) to the pitch circle diameter $D_{TK}$ is >1:6.

3. A cylindrical window-type cage (1) for a needle bearing which receives the needle rollers (6) in pockets (5) uniformly spaced from one another by crossbars (4), said pockets (5) being formed by punching and by stamping with displacement of material in a cage strip (9) so that after the bending round of the cage strip (9), the needle rollers (6) are retained in inward direction by the inclination of the crossbar walls and in outward direction by retaining projections (7, 8), in the unbent state of the cage strip (9), the surfaces of the crossbar walls of a pocket situated opposite each other are formed in the region of the retaining projections (7, 8) with three partial surfaces (10, 11, 12) such that the first partial surfaces (12) are inclined relative to a central vertical line (13) and point towards the center of the pocket while merging at their upper ends into second partial surfaces (10) that are parallel to the central vertical line (13), each of the second partial surfaces (10) ending in a third partial surface (11) which is likewise inclined.

4. A cylindrical window-type cage (1) for a needle bearing which receives the needle rollers (6) in pockets (5) uniformly spaced from one another by crossbars (4), said pockets (5) being formed by punching and by stamping with displacement of material in a cage strip (9) so that after the bending round of the cage strip (9) the needle rollers (6) are retained in inward direction by the inclination of the crossbar walls and in outward direction by retaining projections (7, 8), in the unbent state of the cage strip (9), the surfaces of the crossbar walls of a pocket (5) situated opposite each other are formed in the region of the retaining projections (7, 8) with three partial surfaces (10, 11, 12) such that the first partial surfaces (10) are inclined relative to a central vertical line (13) towards the center of the pocket and merge at their upper ends into likewise inclined second partial surfaces (11), each of the second partial surfaces (11) ending in a third partial surface (12) which is parallel to the central vertical line (13).

5. A cylindrical window-type cage of claim 4 wherein the crossbars (4) are profiled.

* * * * *